United States Patent [19]

Todd

[11] Patent Number: 5,379,407
[45] Date of Patent: Jan. 3, 1995

[54] ERROR HANDLING IN A STATE-FREE SYSTEM

[75] Inventor: Stephen J. P. Todd, Winchester, England

[73] Assignee: International Business Machines Corporation, Armonk, N.Y.

[21] Appl. No.: 4,001

[22] Filed: Jan. 15, 1993

[30] Foreign Application Priority Data

Jun. 16, 1992 [GB] United Kingdom ............... 9212775

[51] Int. Cl.⁶ .................................................. G06F 11/00
[52] U.S. Cl. ................................... 395/575; 371/16.5; 395/133
[58] Field of Search ............... 395/575, 118, 133, 141; 371/16.5, 21.1

[56] References Cited

U.S. PATENT DOCUMENTS

| | | |
|---|---|---|
| 4,209,832 | 6/1980 | Gilham et al. |
| 4,586,038 | 4/1986 | Sims et al. |
| 4,748,572 | 5/1988 | Latham |
| 4,984,180 | 1/1991 | Wada et al. |
| 5,128,885 | 7/1992 | Janis et al. ............ 395/575 |
| 5,142,663 | 8/1992 | Janis et al. ............ 395/575 |
| 5,241,653 | 8/1993 | Collins et al. ......... 395/139 |
| 5,267,246 | 11/1993 | Huang et al. ........ 371/16.5 |
| 5,287,439 | 2/1994 | Koga et al. .......... 395/133 |

Primary Examiner—Robert W. Beausoliel, Jr.
Assistant Examiner—Albert Decady
Attorney, Agent, or Firm—Casimer K. Salys

[57] ABSTRACT

A system and method are disclosed for handling errors in a state-free manner. A digital data processing system is provided which is operable in a state-free manner and has an output generator for generating an output manifestation of a model. An object generator within the system is used to generate objects describing the model, each object being then stored in an object memory. If an error occurs during generation of an object, an error reference is then generated within that object. This error reference provides identifying information for an error object, the error object being stored in an error memory and containing error details for that object. By such an approach the errors are handled in a state-free manner and can be readily retrieved when required.

9 Claims, 2 Drawing Sheets

COMMAND SEQUENCE   A = SPHERE (1);  B = SPHERE (2);   C = A UNION B

COMMAND SEQUENCE   A = SPHERE (1);  B = SPHERE (-2);   C = A UNION B

ERROR HANDLING IN A STATE-FREE SYSTEM

BACKGROUND OF THE INVENTION

The present invention relates to state-free systems and in particular to means for handling error details in such state-free systems.

If a system is referred to as operating in an environment which has 'state', this means that the system retains information about the most recent event (or a number of most recent events) that occurred in the system, and the manner in which a subsequent event is processed depends upon that retained information. If a user wishes to determine which event happened most recently, the information can be recalled readily by means of special calls provided within the system. However if the user is performing complex functions on the system such that several different jobs are being processed during the same period of time, then isolating events resulting from one particular job is difficult. Similarly when several users are using the system simultaneously the events arising from the actions of one particular user will not be isolated from events resulting from the other users' actions. This causes problems if a user wishes to analyse the events that have occurred due to his interaction with the system.

To overcome this problem 'State-free' systems were developed. They are designed to enable multiple users to work independently in an environment where they are completely unaware of other simultaneous users. Further, they enable a single user to run a complex program without any 'side effects' arising that might cause interaction between different parts of the user's program. However, although systems have been developed which create and manipulate sets of data, hereafter referred to as 'objects', in a state-free environment, there has remained a problem of how to deal with errors in a state-free manner.

Typically prior art systems have recorded errors in error stacks. An error stack is a region of memory having a plurality of addressable locations. These locations are written to sequentially as errors occur and a reference pointer keeps track of the last location written to. Hence an error stack is not state-free. The error stack can be interrogated by special calls entered by the user but the errors are merely read out in sequential order, the most recent error being read out first, In other words the errors are held in a first-in-first-out queue. An alternative ways of handling the errors is to only retain details of the last error, i.e. to have an error stack with just one addressable location.

SUMMARY OF THE INVENTION

An object of the present invention is to provide a system in which errors are handled in a state-free manner so that users who are sharing the system can more readily trace the errors that their particular application is generating, or a single user can better keep track of the errors being generated by different parts of his program.

Accordingly the present invention provides a digital data processing system operable in a state-free manner, comprising an output generator for generating an output manifestation of a model manipulated by the system, an object generator for generating objects describing: the model, and an object memory for storing the objects, characterised by: the object generator generating a field within a given object for storage of an error reference: an error generator for generating an error object containing error details for that object and storing the error object in an error memory; the error generator further providing the error reference to the object generator, the error reference providing identifying information for the error object.

The system of the present invention has the advantage that it handles errors in such a way that users are better able to analyse the source of such errors than was previously possible with prior art systems.

In preferred embodiments, in the event of no error occurring during generation of the given object, the object generator stores a null reference in the field within that object.

In preferred embodiments the data processing system further comprises a locating device, responsive to an object reference, for locating a particular object and extracting the error reference from that object. Said error reference can then be used to locate the error object containing error details for the particular object, whereby the system can readily reproduce error details for the particular object.

If the particular object is altered so that it is no longer in error, then in preferred embodiments the result of the alteration is propagated to any dependent objects, and any error references and error objects associated with those dependent objects are altered accordingly.

The object memory and error memory can be any memory available to the system, but in preferred embodiments the object memory and the error memory are different parts of the same real memory.

The error reference provided within the object can be any identifying information for the error object. Typically the error reference will be a memory address for the error object, or will take the form of an error number. The error number may identify several things, such as an error string held in an external file. Further the number may be associated with a number of error strings, each error string containing, for example, error details in a different national language.

Typically a control language is used to control the object generator, the control language and the object generator either operating asynchronously or synchronously. In the preferred embodiment the control language and object generator are able to operate asynchronously.

Viewed from a second aspect the present invention provides a method of handling errors in a digital data processing system, said system being operable in a state-free manner and having an output generator for generating an output manifestation of a model manipulated by the system, comprising the step of generating objects describing the model, said method being characterised by the steps of: generating an error object if an error occurs during generation of a given object, the error object containing error details for that object: storing the error object in an error memory; generating an error reference to provide identifying information for the error object, and locating the error reference within the given object; and storing the given object in an object memory.

In preferred embodiments the method will comprise the further step of storing a null reference in place of the error reference if no error arises during generation of the given object.

The present invention will be described further, by way of example only, with reference to an embodiment thereof as illustrated in the accompanying drawings, in which:

DESCRIPTION OF THE PREFERRED EMBODIMENT

In the description that follows we will consider the situation in which a user is using a graphics package on a multiple user system.

Figure 1:
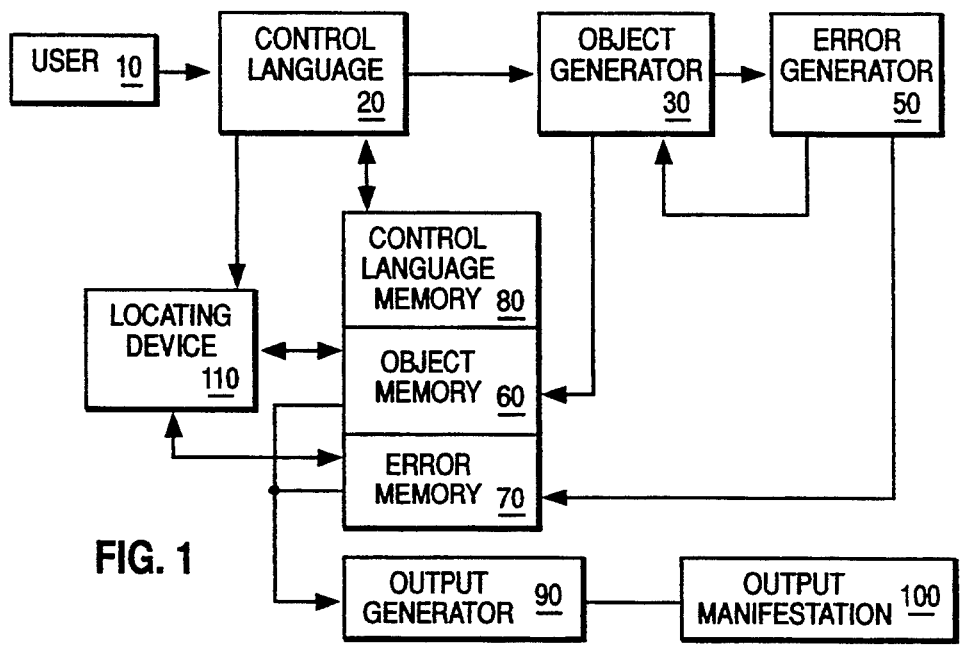
FIG. 1 is a block diagram showing the arrangement of a system in accordance with the preferred embodiment of the present invention.
Figure 4:
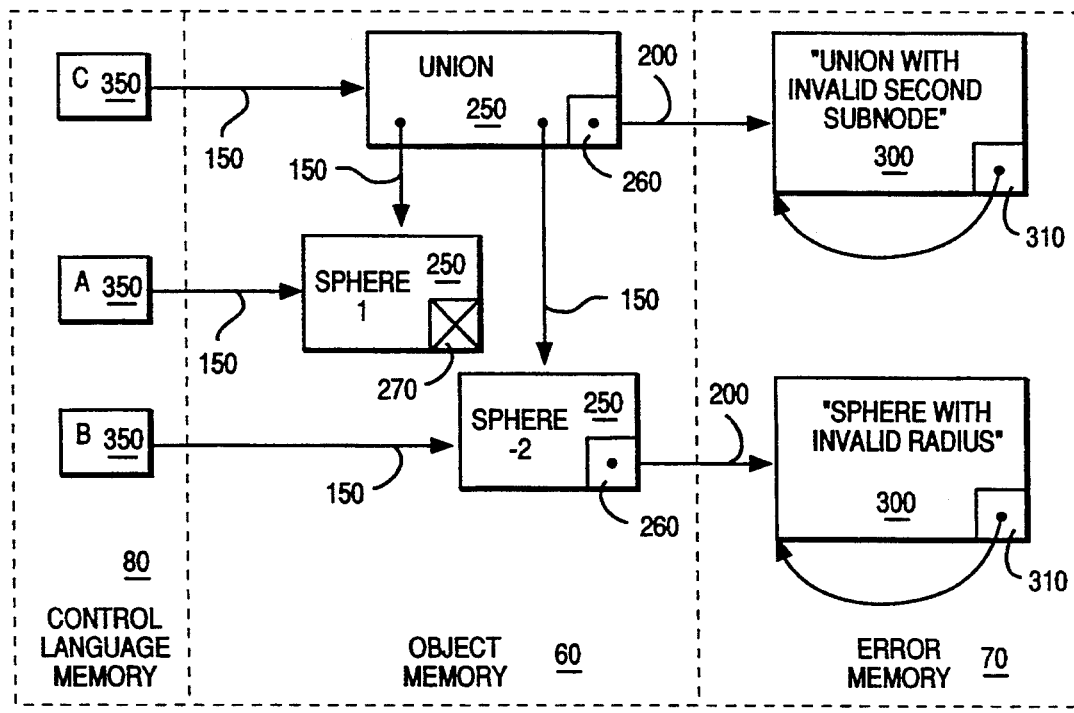
FIG. 4 illustrates the contents of the system memory after three object generating steps, one correct, one in error, and one in error due to inheriting the Previous error.

With reference to FIGS. 1 and 4, the operation of the system of the preferred embodiment will now be described. A user 10 interacts with the system either by entering individual commands or by running a program to present a sequence of commands to the system. Control language 20 within the system receives these commands and interprets them. For the purposes of the invention the particular control language used is not important; typical examples would be SmallTalk or 'C'. Any variables created by the control language during this process can be stored in the control language memory 80. The control language memory 80 can be any area of memory that is defined as being accessible by the control language 20, but in the preferred embodiment it is part of the real memory of the system.

If the control language 20 receives a command requesting details of a particular part of a model to be stored it will send the relevant information to the object generator 30. Here an object 250 will be generated containing a description of that part of the model. For the purposes of the present invention, it does not matter how that part of the model is described by the object. For example the object may contain a pixel-by-pixel description of the part of the model detailed, it may just contain a number of descriptors that would enable a pixel-by-pixel reconstruction to be generated at a subsequent time, or indeed may contain any other characterising information of the model.

Further the object generator 30 will create a field within the object 250 in which to store either an error reference 260 or a null reference 270. If no error becomes apparent during generation of the object 250 then this field will be set to a null reference 270, and the resulting object 250 will be stored in object memory 60.

If, however, an error does become apparent during generation of the object 250 then the error generator 50 will be requested to generate an error object 300 containing details of the error. This error object 300 is then stored in a location of error memory 70. In the preferred embodiment the error memory 70 is part of the real memory of the system. The error object may be generated from scratch or, alternatively, an error object for each possible error type could be prestored and then referenced each time an error of that type occurs.

Once the error object 300 has been stored, the error generator 50 will provide an error reference 260 to the object generator 30 giving identifying information for the error object 300. This error reference 260 may take any appropriate form, but in the preferred embodiment is a memory address, or 'pointer', for the error object 300. The error reference 260 received by the object generator 30 is placed in the field created within the object 250, and then the entire object 250, including the error reference 260, is stored in the object memory 60; in the preferred embodiment this object memory 60 resides in the real memory of the system. Finally an object reference 150 is returned to the control language 20 so that variables in the control language memory 80 can be referenced to the object 250. The object reference 150 can take any appropriate form but in the preferred embodiment the object reference 150 is a memory address, or 'pointer', for the object 250.

Figure 2:
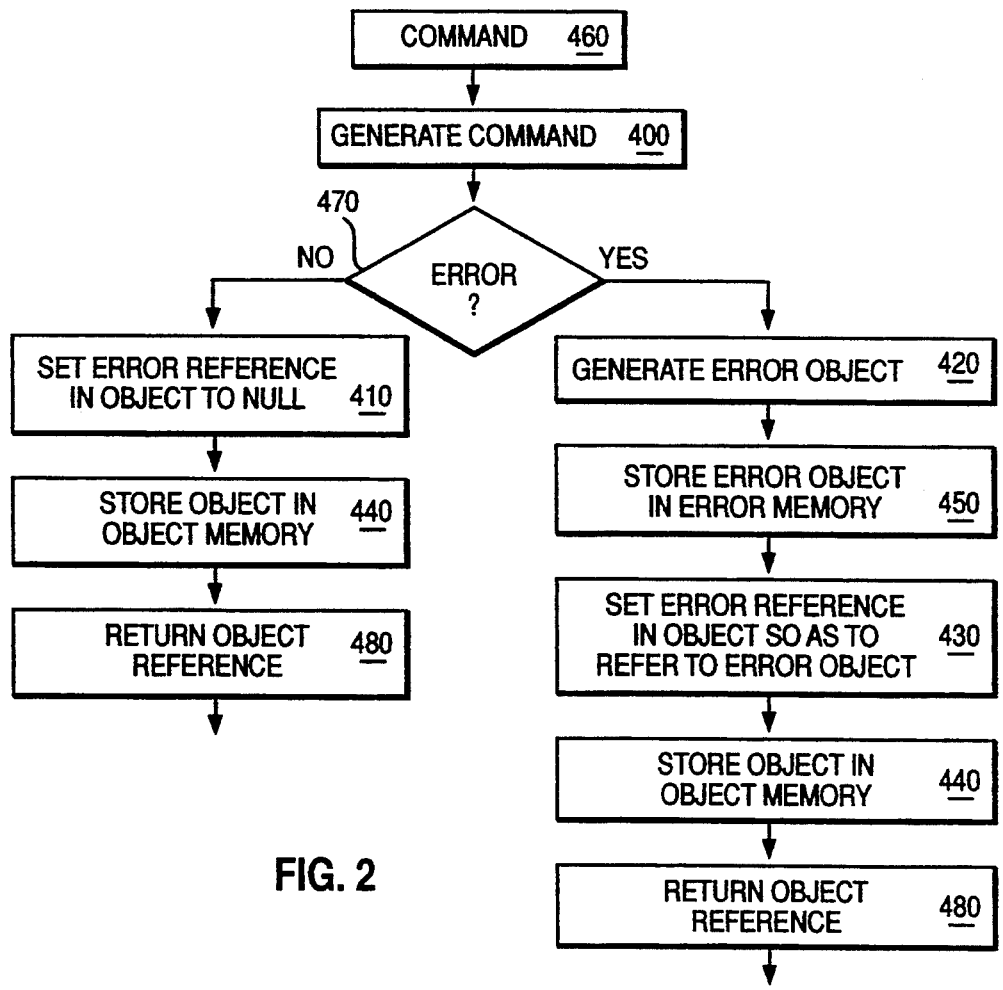
FIG. 2 is a flow diagram illustrating the method of the preferred embodiment of the present invention.

The method of the preferred embodiment will be further explained with reference to the flow diagram in FIG. 2. At step 460 a command for an object to be created is received by the object generator 30. The object is then generated at step 400 and an error query is made (step 470). If no errors are apparent then the method described in the left-hand path of FIG. 2 is carried out. At step 410 the error reference field within the object is set to a null reference 270. Then, at step 440, the object 250, including the null reference 270, is stored in object memory 60. Finally an object reference 150 is returned to the control language 20 (step 480).

If, however, at step 470 an error is apparent, then the method described in the right-hand path of FIG. 2 is carried out. At step 420 an error object 300 is created and is then stored at step 450 in the error memory 70. At step 430 the error reference 260 is set and then the object 250, including the error reference 260, is stored in object memory 60 (step 440) . Finally at step 480 the object reference 150 is returned to the control language 20.

Figure 3:
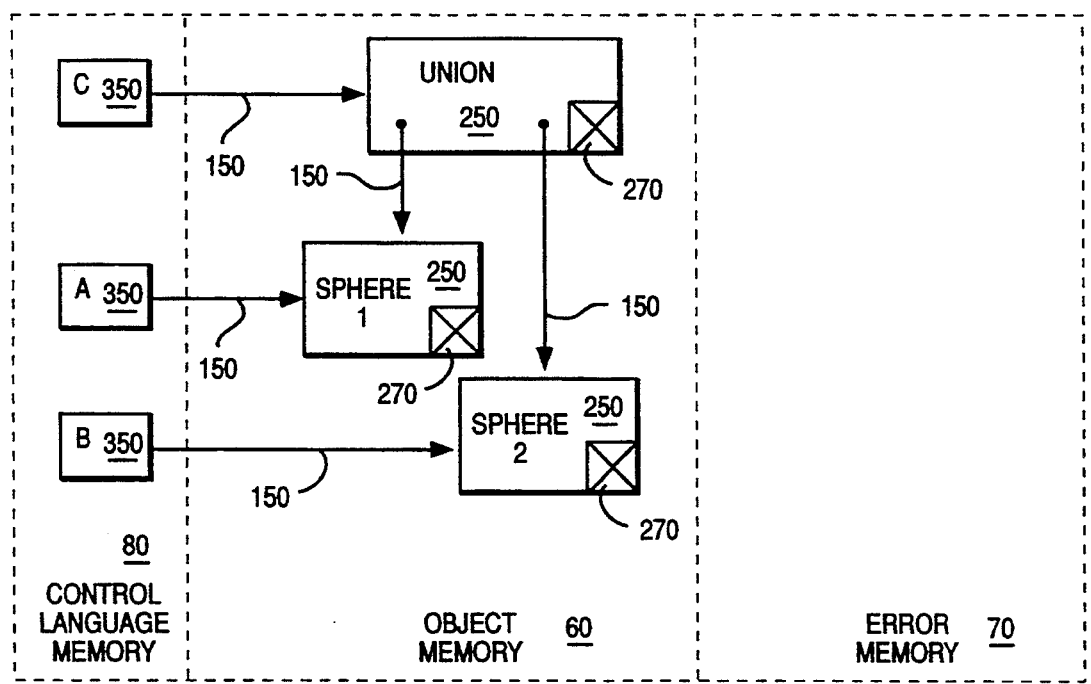
FIG. 3 illustrates the contents of the system memory after three correct object generating steps.

We will now consider the state of the system memory during operation of the system of the preferred embodiment. In the preferred embodiment the system memory is divided between control language memory 80, object memory 60 and error memory 70. FIG. 3 illustrates the contents of the system memory after three correct object generating steps. To the right of FIG. 3 there is shown the three commands that have resulted in the illustrated state of the system memory. The first command "A:=SPHERE(1)" instructs the system to associate a variable 'A' with an object describing a sphere of radius 1 unit. The variable 'A' 350 is generated by the control language 20 and stored in control language memory 80. The object 250 is generated in the manner already described with reference to the lefthand column of FIG. 2, the error reference field being set as a null reference 270, and the resulting object 250 being stored in the object memory 60. An object reference 150 is returned to the control language 20 so as to enable reference to be made between the variable 'A' 350 and the area of object memory containing the 'sphere(1)' object 250. In a similar manner the second command "B:=SPHERE(2)" produces a variable 'B' 350 and an associated 'sphere(2)' object 250 as can be seen in FIG. 3.

The next command "C:=A UNION B" instructs the system to generate a control language variable 'C' 350 and to associate that with an object 250 arising from the combination of the objects associated with variables 'A' and 'B'. The object generator 30 creates the 'union' object 250 by including details of the way the two sphere objects are to be combined and also object references 150 describing the locations of the 'sphere(1)' and 'sphere(2)' objects in the object memory 60. These two objects: references 150 relating the 'union' object to the two 'sphere' objects are shown in FIG. 3 by arrows. No errors occurred during generation of the three objects so each object 250 has a null reference 270 therein rather than an error reference 260 to an error object 300.

Now consider FIG. 4 which, like FIG. 3, shows the state of the system memory after three commands. However, in this example, errors have occurred. The first command is identical to the first command in FIG. 3 and hence results in the system memory being in the same state as in the FIG. 3 example. However the second command "B:=SPHERE(−2)" is instructing the system to associate the variable 'B' with an object describing an unreal model, i.e. a sphere with a radius of '−2'. The procedure as described with reference to the right-hand column of FIG. 2 is now followed. Hence an error object 300 containing the comment "SPHERE WITH INVALID RADIUS" is created and stored in error memory 70. An error reference 260 is then created within the object 250 containing identifying information error object 300 and the object 250 is stored in object memory 60, an object reference 150 being returned to the control language 20 in the normal way. Typically the identifying information making up the error reference 260 will be the memory address for the error object 300.

When the third command "C:=A UNION B" is made, this will of course be in error as well since it makes use of the 'sphere(−2)' object. The union object will be created such that it contains an error reference 260 identifying an error object 300 in which the details "UNION WITH INVALID SECOND SUBNODE" is stored.

The error object 300 can take any convenient form, but in the preferred embodiment the error object has an error reference 310 therein so as to be of similar form to the object 250. These error references 310 give address information for the error objects 300 in which they reside. This is illustrated in FIG. 4 by arrows pointing from the error references 310 to the error objects 300 in which they are contained.

By the above approach a complex model can be described by a number of objects 250. If an output manifestation 100 of the model, or indeed any part of the model, is required this can be obtained by means of the output generator 90 shown in FIG. 1. The necessary objects can be located and the information contained therein fed out to the output generator 90. For the purposes of the present invention it is not necessary to describe the output generator 90 in detail. If for example the output manifestation 100 required is an image on a display screen then the output generator 90 could be any of a large number of image generating devices known in the art. Taking FIG. 3 as an example the model described by the 'union' object 250 could be reproduced as an image on a display screen by reading the 'union' object into the output generator 90. As the image is constructed by the output generator 90 the 'sphere(1)' and 'sphere(2)' objects will also be read since the 'union' object has object references 150 which refer to those sphere objects.

The final image constructed can then be fed out to a display screen where the output manifestation will appear.

Having described the system of the preferred embodiment and the manner in which errors are stored, the method by which the error details are extracted from the system will now be described with reference to FIG. 1.

If there is a need to locate a particular object 250 the control language 20 sends the relevant object reference 150 to the locating device 110. In the preferred embodiment the locating device 110 is a typical memory access device and uses the details within the object reference 150 to access the object memory 60 and find the particular object 250 in question. Then the object 250 is read from the object memory 60. If error details for this object are then of interest the error reference field within the object 250 can be read and the details therein used by the locating device 110 to retrieve the related error object 300 from the error memory 70. Hence the system of the preferred embodiment can readily retrieve error details for any object being studied.

If the error details in the error object 300 reveal that the error in the related object 250 is due to a propagation of an error in a previously created object, then that previously created object can readily be identified and its associated error details retrieved. Consider for example the situation illustrated in FIG. 4. Firstly the 'union' object 250 would be retrieved by the locating device 110, and the error reference 260 extracted. Using this error reference the locating device 110 would then extract the error object 300 containing the information "UNION WITH INVALID SECOND SUBNODE". The second subnode field within the 'union' object 250 would then be located and the 'subnode' object reference 150 extracted; this subnode object reference is illustrated in FIG. 4 by the arrow between the 'union' object and the 'sphere(−2)' object. Next the locating device 110 would use the subnode object reference 150 to retrieve the 'sphere(−2)' object 250, from which the error reference 260 would be extracted. This error reference would then be used to retrieve the error object 300 containing the information "SPHERE WITH INVALID RADIUS". Given this information it is apparent that this error is the initial error and not a consequence of any propagated error. The above described stages would be carried out recursively, i.e. the system would keep track of the route that had been taken. This would then enable the system to trace backwards, i.e. unwind the recursion, when errors are being corrected.

In the above example only two errors are traced, but it is possible to perform the above process many times order to trace back through a whole string of related errors until an original error is located.

When the original error and its associated object have been located it is possible to alter the details of the object in an attempt to remove the original error. Once this is done the system can be made to automatically propagate the result of such an alteration to all dependent objects. Returning again to the example in FIG. 4 assume that the 'sphere(−2)' object has been located and corrected by altering the object description to "sphere(2)". The propagation of this correction can be achieved by tracing backwards as mentioned above so as to revisit the error objects which depended upon the original error; in the example of FIG. 4 there is just the one dependent error object 300 with the information "UNION WITH INVALID SECOND SUBNODE" retained therein. This error object can now be removed since the second subnode has been corrected. Generally speaking, if the alteration was sufficient remove the original error then the propagation of the alteration will result in all the dependent error objects being removed.

The preferred embodiment of the present invention also has the advantage that commands executing in the control language 20 are able to run asynchronously from operations carried out by the object generator 30. In the prior art the control language commands had to run synchronously with the object generator operations and then a check had to be made for errors resulting from each operation; if this was not done then tile control language might discover an error at the end of a command sequence and be unable to trace back to the origin of the error. However with the 'state free' error handling system described in the preferred embodiment of the present invention, the error information held in the error memory, and referenced in the object memory, can be used to trace back to the origin of the error and thus determine its precise nature. Then steps can be taken to fix the error.

This ability to run asynchronously enables the system of the preferred embodiment to operate with an increase in performance over the prior art, since the control language commands can run without waiting for particular object generator operations to be completed. The commands from the control language 20 to the object generator 30 must be in a slightly different form to those mentioned earlier, since in asynchronous operation the object references 150 must be generated by the control language 20 rather than returned to the control language by the object generator 30. For example consider FIG. 3 and the associated command sequence. The new command sequence would be:

call sphere('01', 1);
call sphere('02', 2);
call union('03', '01', '02');

The identifiers '01', '02' and '03' are assigned by the control language 20 and used by the object generator 30. By taking this approach the control language can request the creation of the union object without waiting for the object generator 30 to create both of the sphere objects and return their object references 150. These object references 150 are needed by the object generator 30 in order to create the union object 250, and so the object generator will not actually produce the union object until it has completed generation of the sphere objects: however the control language 20 is not held up while such object generation is being performed.

There is one situation in which the control language must be made to wait, whether it is operating asynchronously or not. The situation in question is that in which an error arises due to reference made to an erroneous function external to the system. In such a situation there is no corresponding object 250 in which to store the error reference 260 and so the error must be dealt with there and then.

I claim:

1. In a digital data processing system operable in a state-free manner, of a type having an output generator (90) for generating an output manifestation (100) of a model manipulated by the digital data processing system, an object generator (30) for generating objects (250) describing the model, and an object memory (60) for storing the objects (250), an improvement comprising:

means for generating a field within a given object (250) for storage of an error reference (260);

an error generator means for generating an error object (300) containing error details for that object (250) and storing the error object (300) in an error memory (70);

means for providing the error reference (260) to the object generator (30), the error reference (260) providing identifying information for the error object (300); and mean for storing a null reference (270) in the field of a generated object if no error occurs during the generation of the object.

2. The digital data processing system as claimed in claim 1, wherein a control language (20) is used to control the means for generating, and the control language (20) and the means for generating are operable asynchronously.

3. The digital data processing system as claimed in claim 1, with the capability of reproducing error details for a particular object (250), further comprising:

a locating means, responsive to an object reference (150), for locating a particular object (250) and extracting the error reference (260) from that object (250); and means for using the error reference (260) to locate the error object (300) containing error details for the particular object (250).

4. The system as recited in claim 3, further comprising: means for propogating an alteration which corrects an error in a particular object to any dependent objects, any error references (260) and any error objects (300) associated with those dependent objects.

5. The system as recited in claim 4, in which the object memory (60) and the error memory (70) are different parts of the same real memory.

6. The system recited in claim 5, wherein the error reference (260) is a memory address for the error object (300).

7. The system recited in claim 5, wherein the error reference (260) has the form of an error number.

8. A method of handling errors in a data processing system, said data processing system being operable in a state-free manner and having an output generator (90) for generating an output manifestation (100) of a model manipulated by the system, by generating (400) objects (250) describing the model, comprising the steps of:

generating (420) an error object (300) if an error occurs during generation of a given object (250), the error object (300) containing error details for that object (250);

storing (450) the error object (300) in an error memory (70);

generating (430) an error reference (260) to provide identifying information for the error object (300), and locating the error reference (260) within the given object (250);

storing (440) the given object (250) in an object memory (60); and storing (410) a null reference (270) in place of the error reference (260) if no error arises during generation of the given object (250).

9. The method as claimed in claim 8, further comprising the steps of:

locating by means of an object reference (150) a particular object (250) and extracting the error reference (260) from that object (250); and using said error reference (260) to locate the error object (300) containing error details for the particular object (250).

* * * * *

UNITED STATES PATENT AND TRADEMARK OFFICE
CERTIFICATE OF CORRECTION

PATENT NO. : 5,379,407
DATED      : Jan. 3, 1995
INVENTOR(S) : Stephen J. P. Todd It is certified that error appears in the above-identified patent and that said Letters Patent is hereby corrected as shown below:

Col. 8, line 16, please delete "with the capability of reproducing error details for a particular object (250),";

line 26, after "4. The", please insert --digital data processing--;

line 31, after "5. The", please insert --digital data processing--;

line 32, please delete "the" and substitute therefor --a--;

line 34, after "6. The", please insert --digital data processing;

line 37, after "7. The", please insert --digital data processing; and line 43, after "the", please insert --data processing--.

Signed and Sealed this

Second Day of May, 1995

BRUCE LEHMAN

Attest:

*Attesting Officer*   *Commissioner of Patents and Trademarks*